United States Patent
Nelson

(10) Patent No.: US 10,231,444 B1
(45) Date of Patent: Mar. 19, 2019

(54) RE-REELING APPARATUS FOR FISHING LINE REPLACEMENT

(71) Applicant: J-Me Nelson, Novato, CA (US)

(72) Inventor: J-Me Nelson, Novato, CA (US)

( * ) Notice: Subject to any disclaimer, the term of this patent is extended or adjusted under 35 U.S.C. 154(b) by 735 days.

(21) Appl. No.: 14/795,142

(22) Filed: Jul. 9, 2015

(51) Int. Cl.
 *A01K 89/01* (2006.01)
 *A01K 89/00* (2006.01)

(52) U.S. Cl.
 CPC .................................. *A01K 89/003* (2013.01)

(58) Field of Classification Search
 CPC .................................................... A01K 89/003
 See application file for complete search history.

(56) References Cited

U.S. PATENT DOCUMENTS

| | | | | |
|---|---|---|---|---|
| 3,026,059 A | * | 3/1962 | Dennler | A01K 89/003 242/396.9 |
| 3,199,242 A | * | 8/1965 | Holmstrom | A01K 89/003 43/25 |
| 3,506,213 A | | 4/1970 | Young | |
| 3,614,015 A | | 10/1971 | Sussman | |
| 3,679,151 A | * | 7/1972 | Rice | A01K 89/003 242/129.7 |
| 3,685,761 A | * | 8/1972 | Zelinski | A01K 89/003 242/129.7 |
| 3,776,485 A | * | 12/1973 | Foley | A01K 89/003 242/571.5 |
| 3,830,007 A | * | 8/1974 | Linke, Sr. | A01K 89/003 242/129.51 |
| 3,950,881 A | * | 4/1976 | Hays | A01K 89/003 242/129.51 |
| 3,951,354 A | * | 4/1976 | Bagby | A01K 89/003 242/129.8 |
| 4,034,930 A | * | 7/1977 | Stevenson | A01K 89/003 242/129.5 |
| 4,540,136 A | * | 9/1985 | Rauch | A01K 89/003 242/150 R |
| 4,776,527 A | * | 10/1988 | Prowant | A01K 89/003 242/129.51 |
| 5,029,409 A | * | 7/1991 | Nouwens | A01K 89/003 242/129.8 |
| 5,120,003 A | | 6/1992 | Sacconi | |
| 5,218,779 A | * | 6/1993 | Morgan | A01K 89/003 242/423.2 |
| 5,375,788 A | * | 12/1994 | English | A01K 89/003 242/129.8 |
| 5,513,463 A | * | 5/1996 | Drinkwater | A01K 89/003 242/423.2 |
| 5,855,085 A | * | 1/1999 | Jinks, Jr. | A01K 89/003 242/129.8 |

(Continued)

*Primary Examiner* — Emmanuel M Marcelo
(74) *Attorney, Agent, or Firm* — Hall Estill Attorneys at Law

(57) ABSTRACT

A fishing line re-reeling apparatus supporting a fishing line supply spool for transferring a replacement line to a fishing rod reel, the re-reeling apparatus having a clamp shaped to fit over a fishing rod and having first and second members held together by springs in a closed mode that form a fishing rod cavity. A spool support assembly supports a rod that is, in one mode, for supporting the line supply spool. The clamp is positioned in an open mode upon pressure opposing the force of the springs, the clamp is secured to the fishing rod in the closed mode at a selected angular disposition.

27 Claims, 6 Drawing Sheets

(56) References Cited

U.S. PATENT DOCUMENTS

| | | | | |
|---|---|---|---|---|
| 6,609,673 B1* | 8/2003 | Johnson | ............... | A01K 89/003 242/404.2 |
| 6,640,484 B1* | 11/2003 | Russow | ............... | A01K 89/003 43/25 |
| 6,742,737 B1* | 6/2004 | Conner | ............... | A01K 89/003 242/129.7 |
| 7,523,881 B2* | 4/2009 | Hitomi | ................... | A01K 89/00 242/223 |
| 9,016,614 B1* | 4/2015 | Pouncil | ............... | A01K 89/003 242/566 |
| 2007/0017144 A1* | 1/2007 | Colon | ................. | A01K 89/003 43/25 |
| 2010/0325935 A1* | 12/2010 | Chen | ................... | A01K 89/003 43/25 |
| 2012/0205481 A1* | 8/2012 | Stout | ...................... | B65H 49/32 242/423.1 |
| 2012/0261507 A1* | 10/2012 | Waldbauer | ........... | A01K 89/003 242/599 |
| 2015/0173335 A1* | 6/2015 | Wang | ................... | A01K 89/003 242/590 |

* cited by examiner

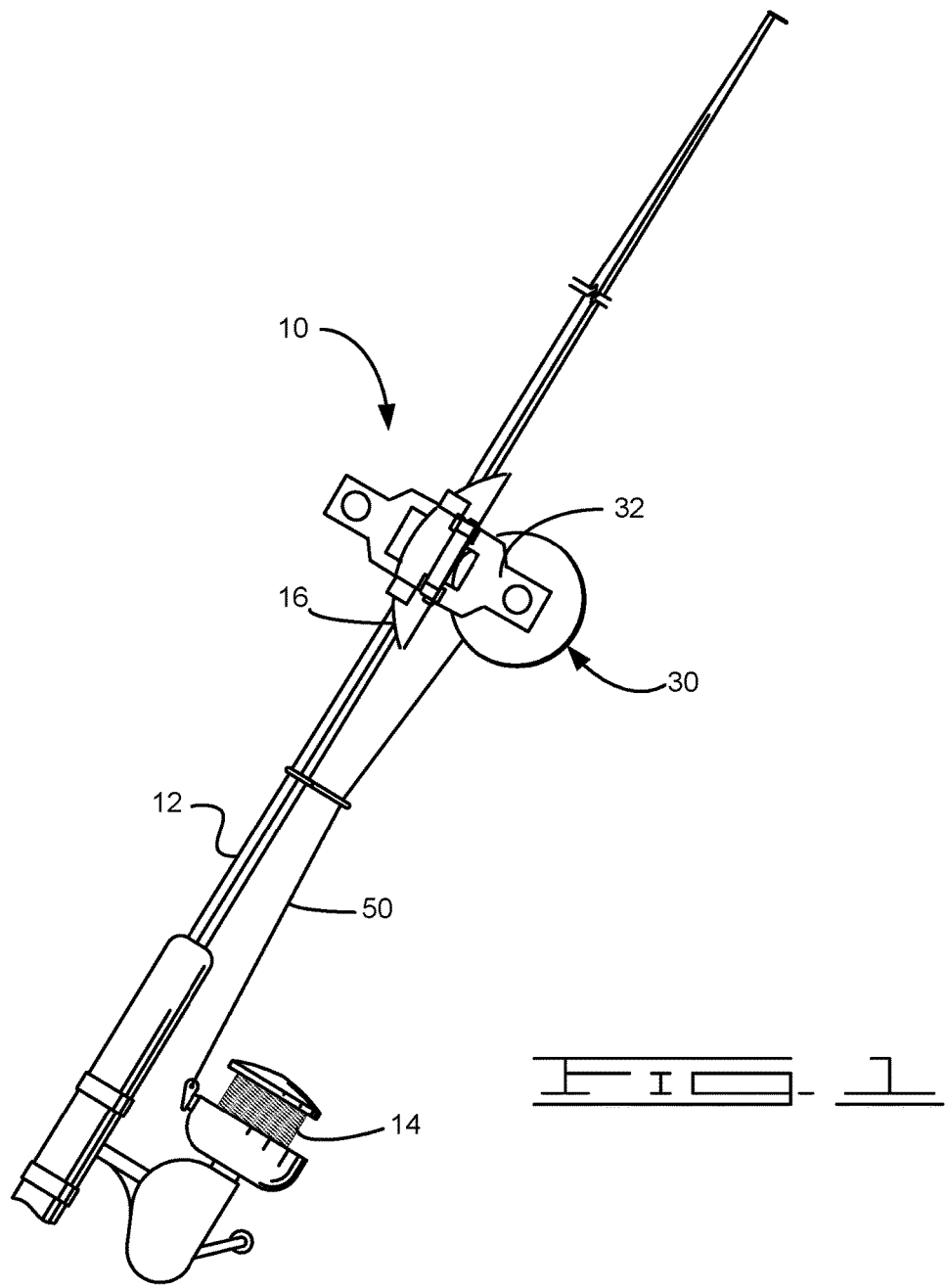

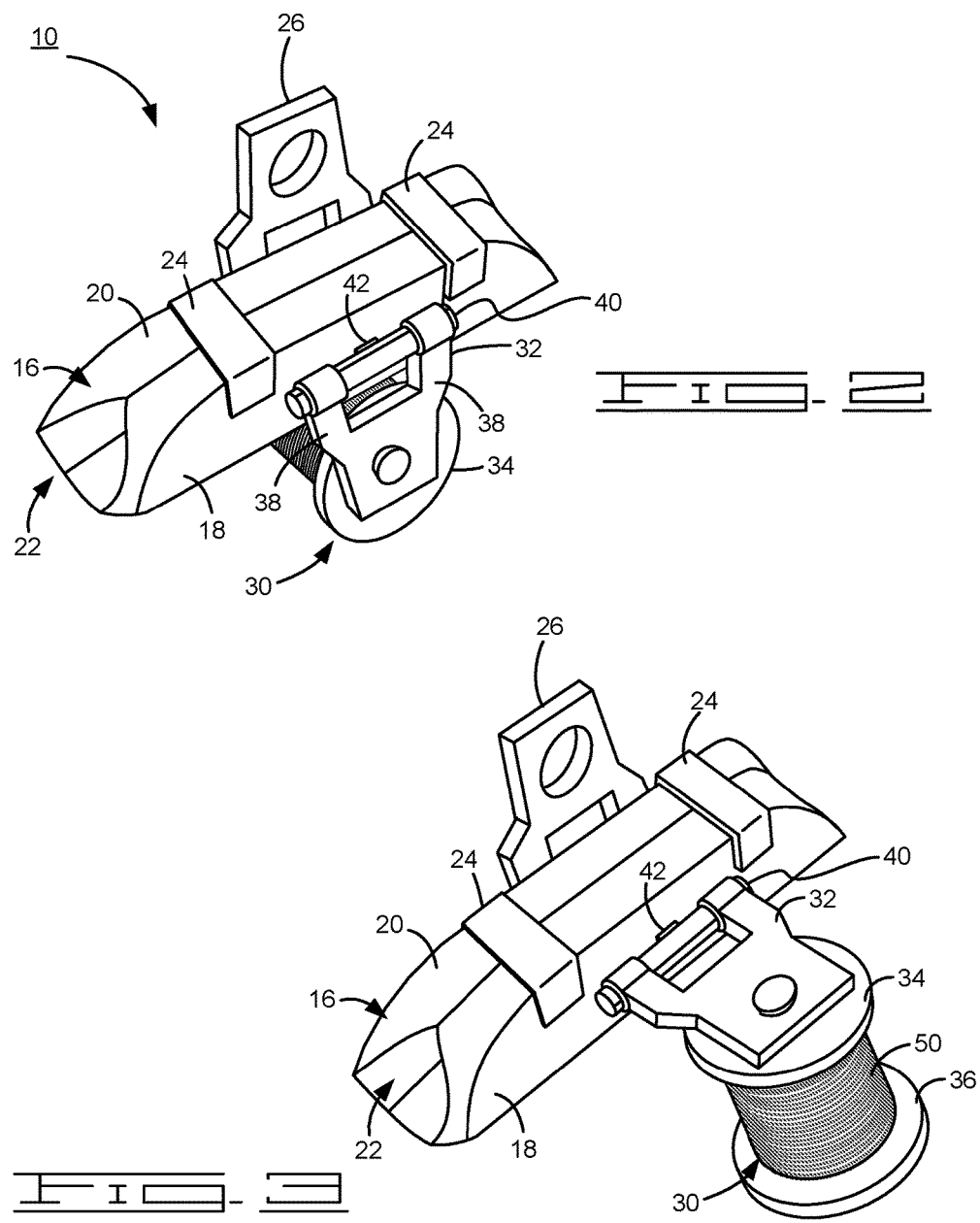

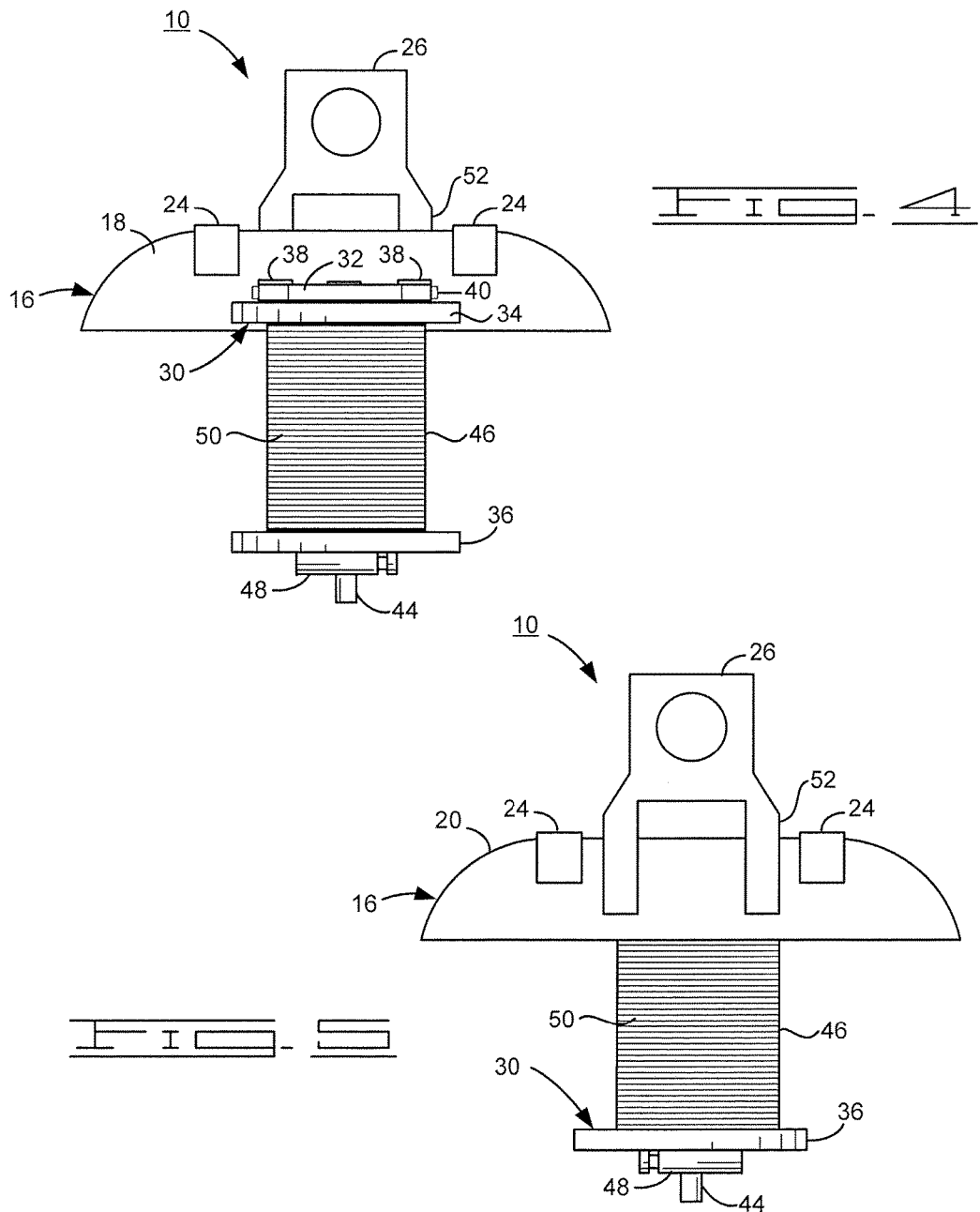

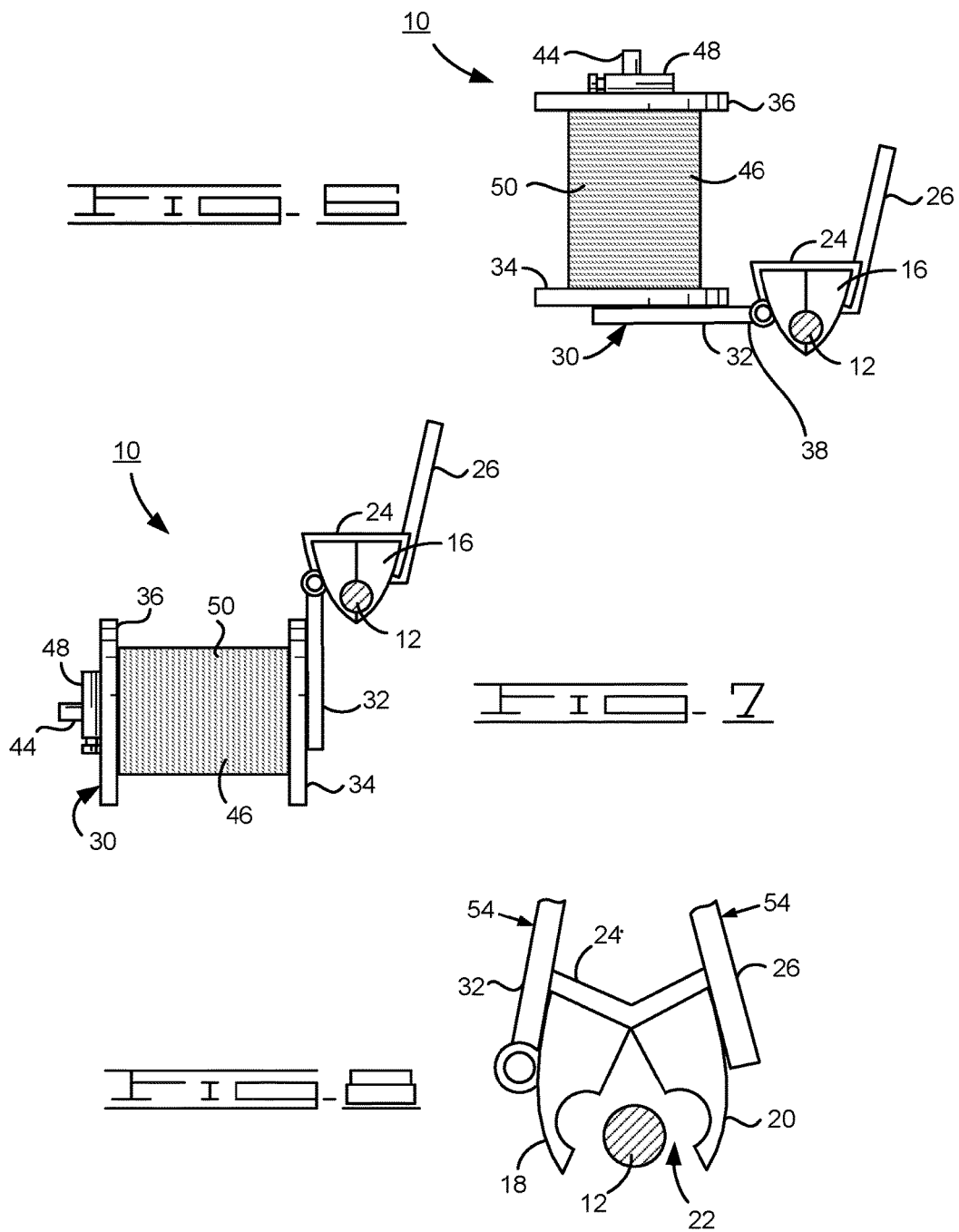

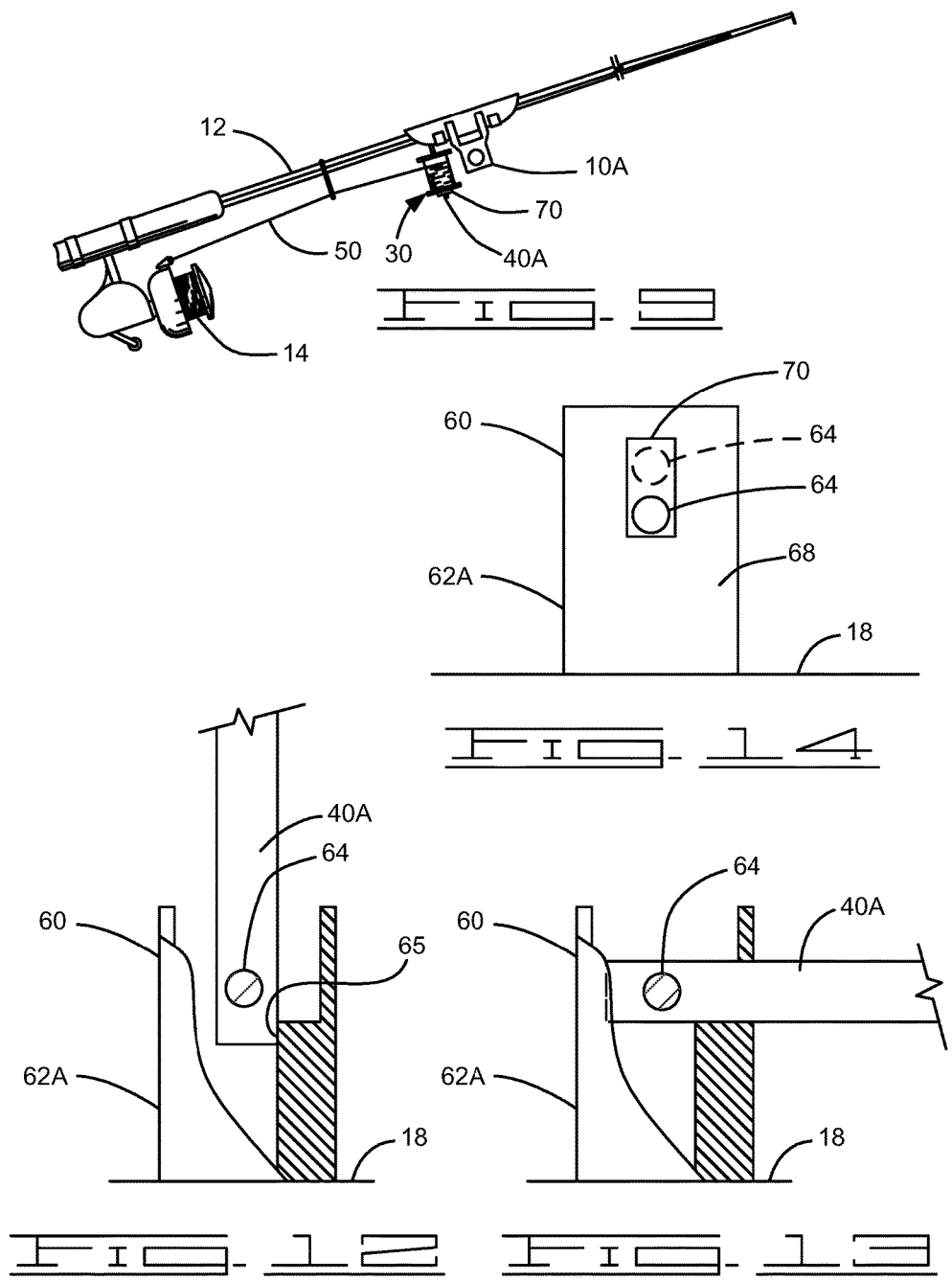

RE-REELING APPARATUS FOR FISHING LINE REPLACEMENT

BACKGROUND

1. Field

The present technology relates to the field of fishing equipment, and more particularly but not by way of limitation, to an improved re-reeling apparatus for fishing line replacement.

2. Discussion

There have been devices that serve the need of transferring fishing line from a supply spool to the reel on a fishing rod, especially for fly fishing, such prior art has failed to satisfy the needs of fishermen with any significant amount of success. The purpose of such devices is primarily to change out a loaded fishing reel to have a fishing line with a different weight and density to meet different strength requirements as the fishing needs are changed.

It has become the custom by many fishermen to have one person hold the line supply spool on a suitable arbor device, often just pencils placed through the bore of the line supply spool, while another person holds the fishing rod while turning the spinning reel handle to load the spool on the fishing rod. The arbor device is preferably held by both hands of the volunteer person. The person holding the line supply spool must apply sufficient force to the line to allow the line to be pulled from the line supply spool while restricting rotation of the line supply spool as the line is wound from there onto the fishing rod reel to avoid line kinking. Should a line entanglement occur, the entangled portion will need to be cut from the supply spool, or if the entanglement is a severe one, the supply spool must be discarded and the supply spool replaced.

There is a need for a fish line re-reeling apparatus that serves the above described spool re-reeling function and in which the re-reeling is performed by a single person, such fish line re-reeling apparatus is sufficiently simple to manufacture, is cost effective, is easily applied to a fishing rod and operable with minimal skill.

SUMMARY

The present application provides a fishing line re-reeling apparatus supporting a fishing line supply spool for transferring a replacement fishing line to a fishing rod reel, the re-reeling apparatus having a clamp shaped to fit over a fishing rod and having a clamp first and second half members held together by spring clips in a closed mode that form a fishing rod cavity along the length of the clamp.

In one preferred embodiment, a spool support assembly, supporting the supply spool, is supported on one half member and a handle member is supported on the other half member, the clamp is positioned in an open mode by pressing the handle member and the spool support assembly toward each other against the resistance of the spring clips.

The clamp in the open mode of the fishing rod cavity is positionable on the fishing rod at a selected angular disposition and secured to the fishing rod upon the release of the handle member and the spool support member.

Another embodiment comprises handle members supported by the first and second halves of the clam clamp, the fishing rod cavity opened by pressing the handle members toward each other for attachment to the fishing rod. A spool support rod is supported by the clam clamp and is positional to assume an extended mode wherein the support rod is substantially normal to the clam clamp and positional to assume a folded mode wherein the support rod extends along the length of the clam clamp. The support rod in the extended position supports the supply spool during transfer of the fishing line.

The advantages and features of the claimed invention will be apparent from the following description when read in conjunction with the accompanying drawings and appended claims.

BRIEF DESCRIPTION OF THE DRAWINGS

FIG. 1 shows a partial view of a fishing rod equipped with a preferred embodiment of a re-reeling apparatus constructed in accordance with the present technology.

FIG. 2 shows a top perspective view of the re-reeling apparatus of FIG. 1 with a supply spool in a clamp beneath unload mode.

FIG. 3 is a similar view to that of FIG. 1 but with the re-reeling apparatus in a lower clamp side unload mode.

FIG. 4 is a front elevational view of the re-reeling apparatus of FIG. 3 with the supply spool in the side lower unload mode.

FIG. 5 is a rear elevational view of the re-reeling apparatus of FIG. 4.

FIG. 6 is an end side elevational view of the re-reeling apparatus of FIG. 1 with the supply spool in a side upper unload mode.

FIG. 7 is an end side elevational view of the re-reeling apparatus of FIG. 1 with the supply spool in a side lower unload mode.

FIG. 8 is a view in semi-detail of the re-reeling apparatus of FIG. 1 showing the opening of the clamp to open mode for mounting the re-reeling apparatus on the fishing rod.

FIG. 9 shows a partial view of a fishing rod equipped with another preferred embodiment of a re-reeling apparatus constructed in accordance with the present technology.

FIG. 12 is a partially cutaway, side elevational view of the support member that pivotally supports the spool support rod that is depicted herein in the extended mode.

FIG. 13 is similar to the view of FIG. 12 except the spool support rod is in the folded mode.

FIG. 14 is a side elevational view of one half of the support member of FIG. 12 depicting the displacement of the pivotal member as the re-reeling apparatus is opened to attach to the fishing rod as depicted in FIG. 9.

DESCRIPTION

Figure 10:
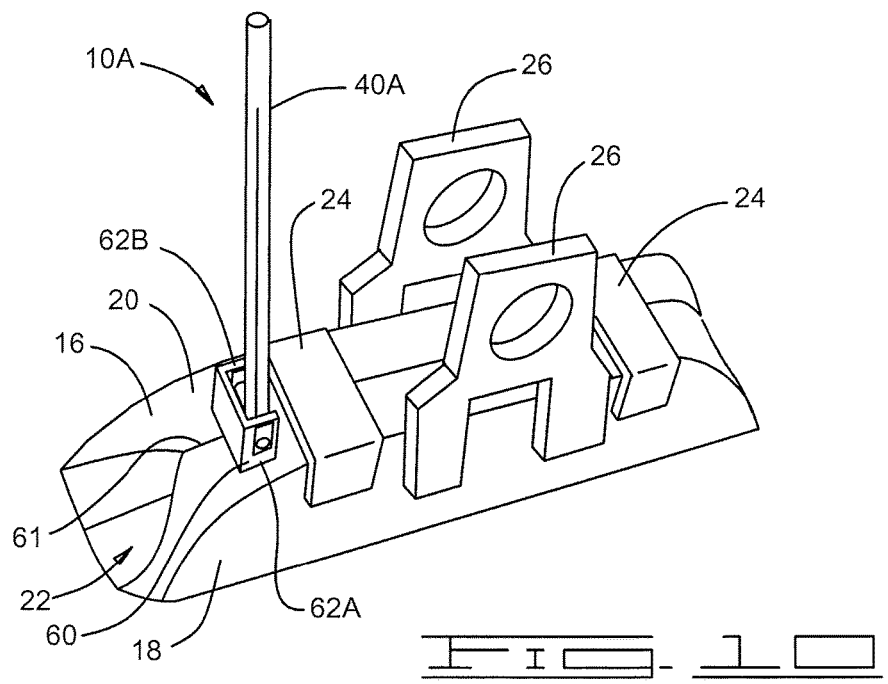
FIG. 10 shows a top perspective view of the re-reeling apparatus of FIG. 9 with the spool support rod in the extended mode.

The drawings generally and more particularly FIG. 1 show therein an embodiment of the re-reeling apparatus 10 constructed in accordance with the present technology and mounted on a fishing rod 12 in position to transfer a fishing line on a supply spool 13 on the re-reeling apparatus 10 to a reel 14 on the fishing rod.

In FIG. 2, the re-reeling apparatus 10 is shown as having a clam clamp 16 that has a clamp first half member 18 and a clamp second half member 20 shaped, when in the positions shown, which is the closed mode, form a hollow interior which is a fishing rod cavity 22. The fishing rod cavity 22 extends the length of the clamp 16, and as will become clear below, defines a space which accepts the fishing rod 12 therein. In these illustrative embodiments, a pair of spring clips 24 are pressed over, and secured to, the tops of the clamp first and second half members 18, 20 to secure the first and second clamp half members in the closed position shown. Alternate embodiments include having the clamp half members joined at the lower edges, and having other forms of springs biasing the clamp half members to the closed position shown.

A handle member 26 is attached to the clamp second half member 20 and extends from there as depicted. Directly across from and supported on the clamp first half member 18 is a spool support assembly 30. The spool support assembly 30 in FIG. 2 is shown in a position in which the supported supply spool is under the clamp 16, while in FIG. 3 the spool support assembly 30 is in a position in which the supply spool is supported to the side of clamp 16. The details of the spool support assembly 30 will now be undertaken.

The spool support assembly 30 has a spool support member 32 supporting a supply spool of fishing line, the supply spool having a cylindrically shaped first end plate 34 and a cylindrically shaped second end plate 36 in these illustrative embodiments. The spool support member 32 has a pair of connector arms 38 connected to a support rod 40 that is journaled to the second half member 18 so that the spool support assembly 30 can be rotated to various positions relative to the clamp 16. Detent 42 presses against the support rod 40 to retain the spool support member 32 to maintain a selected set position.

Turning to FIG. 4 that shows a side elevational view of the re-reeling apparatus 10 in which, as in FIG. 3, the spool support assembly 30 is positioned so that the supply spool 36 is positioned to the side of the clamp 16. This view shows that the spool support assembly 30 has the second end plate 36 has a central bore (not separately numbered) through which a spool support rod 44 extends and is supported to extend from the first end plate 34. In practice, a person will place a fishing line supply spool onto the spool support rod 44 and mount the second end plate 36 onto the spool support rod 44 and push thereon so that a supply spool is positioned between the first and second end plates 34, 36. A spring clip 48 is then placed onto the spool support rod 44 against the second end plate 36. As used herein, the term supply spool is meant to indicate a spool loaded with a fishing line herein numbered 50 that is selected to re-load the reel 14, which is shown in FIG. 1.

In FIG. 5, a view of the opposing side of the re-reeling apparatus 10 to that shown in FIG. 4 shows the handle member 26 that has a pair of downwardly extending leg members 52 that are attached to the clamp second half member 20 such as by an appropriate adhesive, thermal welding or the like. The first and second spring clips 24 are spatially distanced from each other to securely hold the clamp 16 in the closed mode until the handle member 26 and the spool support assembly 30 are pressed together to open the clip 16 for attachment to the fishing rod 12, which will become clear herein below.

FIG. 6 shows a variation of the re-reeling apparatus 10 as the spool support assembly 30 has the first end plate 34 supported on the reverse side of the spool support member 32 to that shown in the above discussed figures. This place the supply spool in FIG. 6 positioned to one side of the clamp 16 but generally above the fishing rod 12 when the clamp 16 is attached thereto in these illustrative embodiments. In FIG. 7, when the spool support member 32 is rotated downwardly from the clamp 16, the supply spool is in a clamp side, down position.

In the above discussion, all of the figures show the clamp first and second halves 18, 20 of the clamp 16 in the closed mode, and it has been stated that these members have an open mode in which the clamp 16 can be placed onto the fishing rod 12. Thus, it is necessary to view these members in the open mode, and that is undertaken in FIG. 8 which is a partial view of the described re-reeling apparatus 10. In FIG. 8 the clamp first and second half members 18, 20 have been opened and held in this position by applying force simultaneously to the handle member 26 and the spool support member 32 as depicted by arrows 54; these forces act against the spring clips 24 that bend as depicted. This rotates the clamp first and second half members 18, 20 to the position shown, which opens the fishing rod cavity to allow entry of the fishing rod 12 as the clamp 16 is positioned over the fishing rod, as depicted in FIG. 8. Upon release of the forces 54 to the handle member 26 and to the spool support assembly 30, the spring clips 24 return to their normal shape; thus, the clamp first and second half members 18, 20 rotate to the closed position, thereby capturing the fishing rod 12 in the fishing rod cavity 22.

The spool support assembly 30 has a spool support member 32, a cylindrically shaped first end plate 34 and a cylindrically shaped second end plate 36. The spool support member 32 has a pair of connector arms 38 connected to a support rod 40 that is journaled to the clamp first half member 18 so that the spool support assembly 30 can be rotated to a position such that the supported supply spool is beneath the clamp 16, beside the clamp 16 or beside the top of the clamp 16. A detent (not depicted) presses against the support rod 40 to retain the spool support member 32 at a selected set position.

FIG. 9 shows therein another embodiment of the re-reeling apparatus 10A constructed in accordance with the present technology and mounted on the fishing rod 12 in position to transfer a fishing line on a supply spool on the re-reeling apparatus 10A to the reel 14 on the fishing rod 12. The same numerical designations are used where the components are identical to the previously described embodiment.

Figure 11:
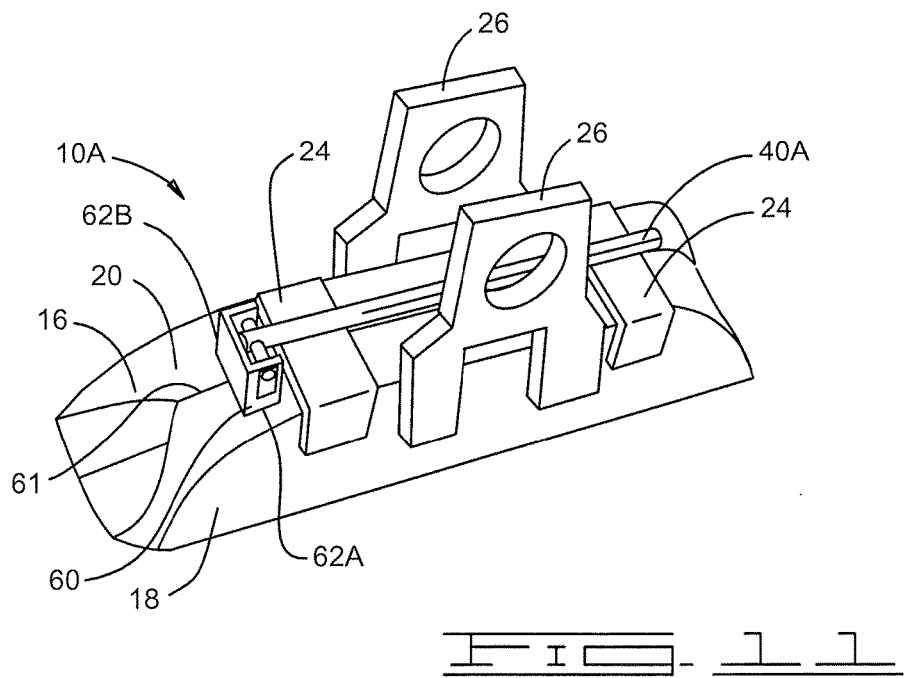
FIG. 11 is a similar view to that of FIG. 10 except the spool support rod is in the folded mode.

In FIGS. 10 and 11, the re-reeling apparatus 10A is shown as having the clam clamp 16 that has the clamp first half member 18 and the clamp second half member 20 that are shaped to form a hollow interior which is the fishing rod cavity 22. The fishing rod cavity 22 extends the length of the clamp 16, which defines a space which accepts the fishing rod 12 therein.

The pair of spring clips 24 are pressed over, and secured to, the tops of the clamp first and second half members 18, 20 to force the first and second clamp half members 18, 20 into the closed position. An alternate embodiment would be having the clamp half members 18, 20 joined at the lower edges and having other forms of springs biasing the clamp half members 18, 20 to the closed position. Handle members 26 are attached to the clamp first and second half members 18, 20 and extend from there as depicted.

Clam clamp 16 supports a support rod 40A that can assume an extended position as depicted in FIG. 10, in which the support rod 40A is substantially normal to the clamp 16; the support rod 40A also assumes a folded position that is shown in FIG. 11. Support rod 40A is supported by a support member 60, which is shown in detail in FIGS. 12-14. The support member 60 is attached to, and straddles the fold line 61 of clamp half members 18, 20. Such attachment can be by an appropriate adhesive, thermal welding, of other satisfactory bonding.

Shown in FIG. 12 is a partially cutaway, side elevational view of a portion of support member 60, which is supported by the clamp first half member 18. The support rod 40A is shown pivotally connected to a first base member 62A by a pivot member 64 that extends from opposing sides of the support rod 40A; it will be understood that a second base member 62B is supported by the clamp second half member 20, the base members 62A and 62B positioned to straddle the fold line 61, and the support rod 40A pivotally supported between the base members 62A, 62B by the pivot member 64.

FIG. 12 shows the support rod 40A in the extended mode, and the base member 62A has an extended inward wall portion 65 against which the lower portion of the support rod 40A abuts when in the extended mode. FIG. 13 is identical to the view of FIG. 12 except that the support rod 40A is in the folded mode and lays against the upper edge of the wall portion 65. It should be noted that the upper portion of the support member 60 is open to allow extension of the support rod 40A therefrom.

The description of the construction of the first base member 62A, as provided above, applies equally to the second base member 62B, so it is unnecessary to describe it further with the exception to be described for FIG. 14. Because the portions of the support member 60 straddle the fold line 61 of the clam clamp 16, the pivot member 64 extending from the support rod 40A will incur movement, and this must be unrestricted by the portions of the support member 60; arbitrarily selected for allowing such movement is the first base member 62A as shown in FIG. 14.

While the pivot member 64 extending from one side of the support rod 40A is captured for pivoting in an aperture (not shown) in the second base member 62B, the pivot member 64 that extends from the other side of the support rod 40A is captured in a channel 70 in the forward wall 68 of the first base member 62A. The length of the channel 70 will be established according to the required movement of the first base member 62A; that is, the movement of the clamp half member 18, 20 when the clam clamp 16 is opened along its fold line 61 by pressing the handle members 26 together to open the fishing rod cavity 22 to position the re-reeling apparatus 10A on the fishing rod 12.

As shown in FIG. 9, the re-reeling apparatus 10A is depicted with the support rod 40A in the extended mode to support a supply spool for transferring the line thereon to the reel 14. A detent 70 attached to the end of the support rod 40A can be employed to secure the supply spool on the support rod 40A.

Described herein is a fishing line re-reeling apparatus that comprises a clam clamp that is shaped to fit over a fishing rod in multiple angular orientations, these members held together by clip means that press the clamp half members together in a closed mode in which position these members form a fishing rod cavity that extends the length of the clamp. A spool support assembly that has a spool support member is supported on the clamp first half member. A supply spool, wound with a selected replacement line, is supported on a support rod. The re-reeling apparatus is supported on the fishing rod to transfer the line on the supply spool to the reel of the fishing rod by turning the fishing rod reel to pull the fishing line from the supply spool onto the fishing rod reel. Once the transfer has been completed, the re-reeling apparatus is removed from the fishing rod, leaving the fishing rod to be used for fishing with the newly transferred fishing line.

It is clear that the present technology is well adapted to carry out the objects and to attain the ends and advantages mentioned as well as those inherent therein. While presently preferred embodiments of the technology have been described in varying detail for purposes of the disclosure, it will be understood that numerous changes may be made which will readily suggest themselves to those skilled in the art and which are encompassed within the spirit of the claimed invention as disclosed and defined in the above text and in the accompanying drawings.

What is claimed is:

1. A fishing line re-reeling apparatus comprising:
    a clamp shaped to fit over a fishing rod, the clamp having a clamp first member and a clamp second member;
    a spring pressing the first and second clamp members together in a closed mode forming a fishing rod cavity sized to grip the fishing rod;
    a spool support assembly supported by a support rod that is journaled to the clamp to selectively rotate relative to the clamp; and
    a handle member supported by the clamp and configured to transfer an applied force to move the clamp members apart in opposition to the spring to open the fishing rod cavity in an open mode.

2. The re-reeling apparatus of claim 1 where the spool support assembly comprises:
    a spool support member attached to the clamp; and
    a spool support rod attached to the spool support member and configured to support a supply spool of fishing line.

3. The re-reeling apparatus of claim 2 wherein the spool support assembly further comprises a removable retainer configured to attach to the spool support rod to retain the supply spool on the spool support rod.

4. The re-reeling apparatus of claim 3 wherein the spring comprises a first spring, and comprising a second spring spatially apart from the first spring, the second spring together with the first spring configured to press the first and second members together in the closed mode.

5. The re-reeling apparatus of claim 4 wherein the spool support member is configured to rotate relative to the clamp.

6. The re-reeling apparatus of claim 1 comprising a detent pressing against the support rod.

7. A re-reeling apparatus for supporting a fishing line supply spool to transfer a fishing line from the supply spool to a fishing rod and reel, the re-reeling apparatus comprising:
    a clamp having a first member and a second member;
    a spring configured to urge the first and second members together in a closed mode defining a cavity that is sized to grip the fishing rod;
    a spool support assembly having a spool support member configured at one end to selectively rotate relative to the clamp and configured at an opposing end to support the supply spool in rotation relative to the spool support member.

8. The re-reeling apparatus of claim 7 where the spool support assembly comprises:
    a spool support member attached to the clamp; and
    a spool support rod attached to the spool support member and configured to rotatably support the supply spool.

9. The re-reeling apparatus of claim 8 wherein the spool support assembly further comprises a removable end plate supported by the spool support rod.

10. The re-reeling apparatus of claim 9 further comprising a fastener configured to retain the removable end plate on the spool support rod.

11. The re-reeling apparatus of claim 10 wherein the spring is a first spring, and comprising a second spring spatially apart from the first spring and urging the clamp members together in the closed mode.

12. A re-reeling apparatus for supporting a fishing line supply spool to transfer fishing line from the supply spool to a fishing rod and reel, the re-reeling apparatus comprising:

a clamp having a first member and a second member;

a pair of springs spatially apart and configured for pressing the first and second members together in a closed mode to grip the fishing rod;

a supply spool support assembly supported on the clamp and configured to support the supply spool.

13. The re-reeling apparatus of claim 12 where the supply spool support assembly comprises a spool support rod attached to the clamp.

14. The re-reeling apparatus of claim 13 wherein the supply spool support assembly comprises first and second end plates retaining the supply spool on the spool support rod.

15. The re-reeling apparatus of claim 14 further comprising a retainer configured to retain the second end plate on the spool support rod.

16. The re-reeling apparatus of claim 12 wherein the spool support assembly comprises a spool support member having one end rotatably supported to the clamp and an opposing end supporting the spool support rod.

17. A fishing rod and reel re-reeling apparatus comprising:

a clamp shaped to fit on the fishing rod, the clamp having a first member and a second member defining a cavity sized to grip the fishing rod;

a spring pressing the first and second members together in a closed mode forming the cavity;

a fishing line spool support assembly supported by the clamp; and a first handle supported by the first clamp member and a second handle supported by the second clamp member, the clamp positioned in an open mode by moving the handles in opposition to the spring, the clamp in the open mode configured to clearingly receive the fishing rod between the clamp members.

18. The re-reeling apparatus of claim 17 wherein the fishing line spool support assembly comprises a spool support rod supported by one of the handles.

19. The re-reeling apparatus of claim 18 wherein the spool support rod is configured to move between an extended mode wherein the spool support rod is substantially normal to the clamp and a folded mode wherein the spool support rod extends substantially along the clamp.

20. The re-reeling apparatus of claim 19 further comprising a second spring supported by the clamp spatially apart from the first spring, the springs configured to urge the first and second clamp members together in a closed mode.

21. A re-reeling apparatus for supporting a fishing line supply spool to transfer fishing line from the supply spool to a fishing rod and reel, the re-reeling apparatus comprising:

a clamp having a first member and a second member;

means for pressing the first and second members together in a closed mode;

a fishing line spool support assembly supported by at least one of the first and second clamp members; and handle members supported by the first and second clamp members and configured to move the first and second members apart in opposition to the means for pressing in an open mode of the clamp.

22. The re-reeling apparatus of claim 21 wherein the fishing line spool support assembly comprises a spool support rod.

23. The re-reeling apparatus of claim 22 wherein the spool support rod is configured to move between an extended mode wherein the spool support rod is substantially normal to the fishing rod and a folded mode wherein the spool support rod extends substantially parallel to the fishing rod.

24. The re-reeling apparatus of claim 23 where the clip means comprises a pair of springs spatially apart urging the first and second clamp members in a closed mode.

25. The re-reeling apparatus of claim 24 comprising support means for supporting the spool support rod on the clamp.

26. The re-reeling apparatus of claim 25 wherein the support means comprises:

a first base member supported on the first clamp member;

a second base member supported on the second clamp member;

a pivot member extending from one of the base members.

27. The re-reeling apparatus of claim 26 wherein the spool support rod is attached to the pivot member.

* * * * *